April 9, 1940.  A. J. BERG ET AL  2,196,186

HEAT EXCHANGE ELEMENT AND PROCESS OF MAKING SAME

Filed Feb. 14, 1936   3 Sheets-Sheet 1

INVENTOR
ALFRED J. BERG
JOHN O. HUSE
BY
Robert A. Lavender
ATTORNEYS.

April 9, 1940. A. J. BERG ET AL 2,196,186
HEAT EXCHANGE ELEMENT AND PROCESS OF MAKING SAME
Filed Feb. 14, 1936  3 Sheets-Sheet 2

INVENTOR
ALFRED J. BERG
JOHN O. HUSE
BY
ATTORNEY

April 9, 1940. A. J. BERG ET AL 2,196,186
HEAT EXCHANGE ELEMENT AND PROCESS OF MAKING SAME
Filed Feb. 14, 1936   3 Sheets-Sheet 3

INVENTOR
ALFRED J. BERG
JOHN O. HUSE
BY
ATTORNEY

Patented Apr. 9, 1940

2,196,186

UNITED STATES PATENT OFFICE 2,196,186

HEAT EXCHANGE ELEMENT AND PROCESS OF MAKING SAME

Alfred J. Berg, Portsmouth, N. H., and John O. Huse, United States Navy

Application February 14, 1936, Serial No. 63,897
6 Claims. (Cl. 29—157.3)

(Granted under the act of March 3, 1883, as amended April 30, 1928; 370 O. G. 757)

This invention relates to a new and useful heat and cold exchanging element and method of making the same, and has for its object the production of a more efficient, economical, and durable heat and cold exchanging element of greater heat and cold exchanging capacity per unit of weight, length, and size of apparatus and cheaper of production than has been possible by following the teachings of the prior art.

A further object of this invention is to provide a new and useful method of making such element.

Other objects of this invention will become apparent, at least to those skilled in this art, from the following specification together with the advantages, inherent and otherwise, of this invention in its several related aspects of article and method.

Heretofore, heat and cold exchanging elements have been constructed with the body portion, which is most frequently of a hollow or tubular article, having its wall thicker and heavier than would be required to resist the pressure and corrosion or other deteriorating action, to which the same is required to be subjected in use. Such thicker, heavier wall is required to be employed in order that the same may be provided with grooves or other means for mounting thereon and securing thereto the projecting ribs or fins which are required to increase the rate of exchange of heat and cold to and from the body wall.

The present invention employs a substantially thinner, lighter body wall of no more strength than required to resist the action thereon of the forces and agencies encountered in use, without disturbing the exterior surface or otherwise impairing the body wall. In the execution of this concept, the heat and cold exchanging ribs or fins are mounted upon and secured to the virgin surface of the body wall without impairment of any of the characteristics of such body wall; and the form, arrangement, means for securing the parts together, as well as the method of making the same, have been devised and employed in furtherance of said concept.

In the drawings:

Fig. 1 is an end view, partially in perspective, diagrammatically illustrating one means for making the ribs or fins in accordance with my invention;

Fig. 2 is a top plan view of the parts shown in Fig. 1;

Figure 11:
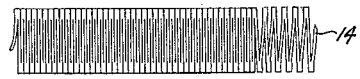
Fig. 11 is a top plan view of a portion of a row of ribs or fins constructed in accordance with Fig. 3.
Figure 12:
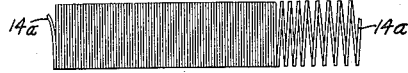
Fig. 12 is a top plan view of a portion of a row of ribs or fins constructed in accordance with Fig. 4.

In the drawings, in which like characters of reference indicate the same parts, 10 is a preferably rectangular tube of copper or other metal, which is slidably mounted and supported at least upon its opposite sides and lower surface by a guide not illustrated; 11 is a rock shaft having secured thereto radially extending knife bars 12, angularly spaced apart and having cutting edges 13 facing each other, the distance between edges 13 exceeding the width of the tube 10, as indicated by the dotted lines representing knives 12 on opposite sides of tube 10 shown in Fig. 1. When shaft 11 is rocked, one of the cutting edges 13 of knife 12 will commence to make a shearing cut on the adjacent corner of tube 10, which cut will be continued through the tube 10 and terminate when the edge 13 of such knife 12 is substantially parallel with the inner surface of the opposite vertical wall of tube 10. Thereupon such knife 12 will retreat from such cut and come momentarily to rest. During such rest period the tube 10 is longitudinally moved further toward the plane in which the knife edges 13 lie, said movement being for a distance represented by the required thickness of the individual rib or fin 14 to be formed by each such cut of a knife 12. Whereupon tube 10 is held in fixed position on its said supports while the opposite knife 12 is making a similar cut in the opposite direction in tube 10. These cutting, spacing, and holding operations are repeated and the requisite length of a row of the thus severed ribs or fins 14 is formed. The means for spacing and holding the tube 10, as well as for rocking the shaft 11, are not shown in the drawings as the same may be performed by hand or by a number of existing apparatus with or without substantial modification, as those skilled in the art will readily understand herefrom. These opposite cuts in tube 10 are more fully shown in Figs. 3 and 11, and such cuts may be made by hand, by a hack saw, a knife or other cutter. We prefer not to make such cuts with a saw for the economical reason that the saw wastes the metal of the tube 10 comprised in the area of the saw cut, while the knife or shear cut does not waste any of the metal of tube 10, and the knife cut has the additional slight advantage of expanding and separating the alternate severed sides from each of the separate ribs or fins 14 thus formed, as indicated at the right end of Fig. 11.

Figure 3:
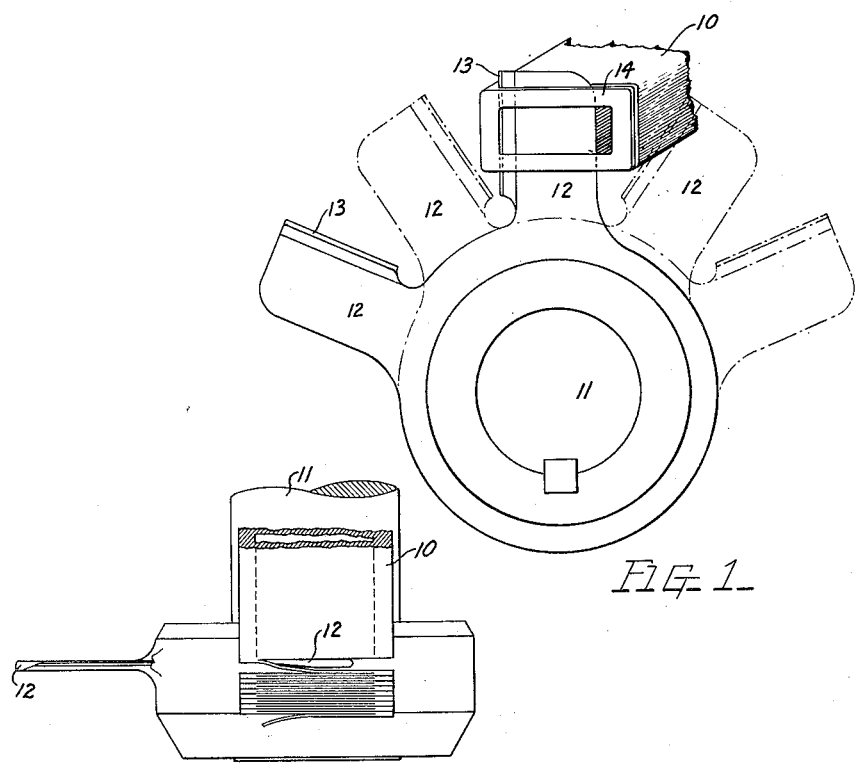
Fig. 3 is a perspective view of a number of such ribs or fins which may be made by the apparatus shown in Figs. 1 and 2.
Figure 4:
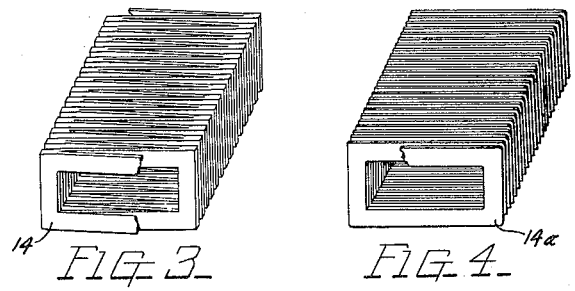
Fig. 4 is a perspective view of a row of ribs or fins which may be differently produced.

The row of ribs 14a of Fig. 4 is formed by helically coiling or winding about an oblong form a thin relatively narrow strip of metal of rectangular cross section. This produces a hollow rectangular helically shaped tube similar to that differently produced by the structure of Fig. 3.

Figure 13:
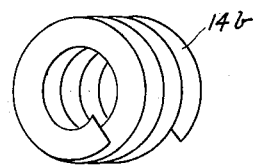
Figs. 13 and 14 are perspective views of differently shaped ribs or fins.
Figure 14:
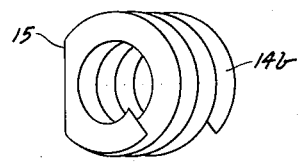

In Figs. 13 and 14 we have illustrated the formation of a row of ribs or fins 14b resulting from the helical coiling of a flat, thin, relatively narrow ribbon of metal wound edgewise about a central forming member which may be round. In Fig. 14 one edge of each of the ribs or fins 14b comprising the helical coil has been flattened at 15 preferably by the severance of metal from each of the ribs or fins 14b comprising the helical coil.

Figure 5:
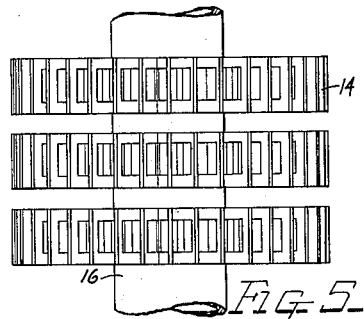
Fig. 5 is a top plan view of a portion of a heat exchanger body or tube having mounted thereon in separated rows the ribs or fins disclosed in Fig. 3.
Figure 8:
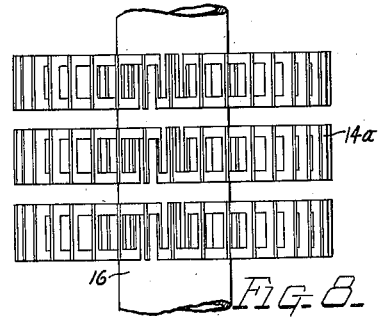
Fig. 8 is a view similar to Fig. 5 but illustrating the ribs or fins of Fig. 4 applied to the body portion in separated rows or rings.
Figure 6:
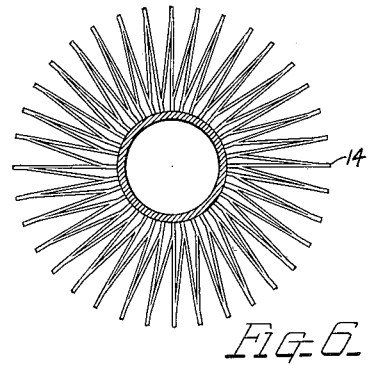
Fig. 6 is an end view with the body or tube in cross section, of the parts shown in Fig. 5.
Figure 9:
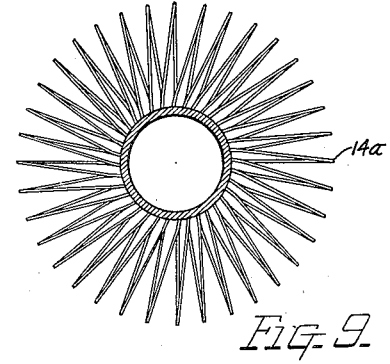
Fig. 9 is an end elevation view of the parts shown in Fig. 8 with the body or tube in cross section.
Figure 7:
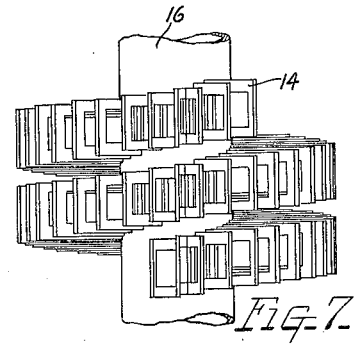
Fig. 7 is a view similar to Fig. 5 but illustrating the ribs or fins applied helically about the body portion.
Figure 10:
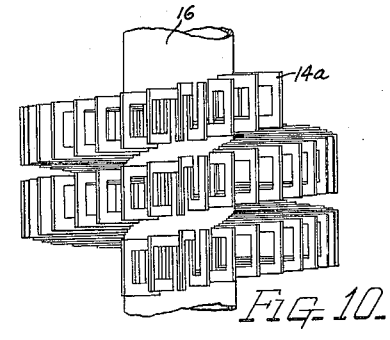
Fig. 10 is a top plan view similar to Fig. 7 but employing the ribs or fins of Fig. 4.
Figure 15:
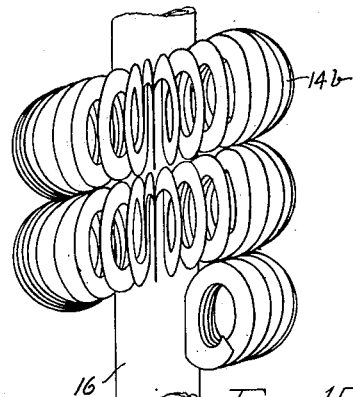
Fig. 15 is a top plan view of a portion of a heat exchanger body or tube having helically coiled thereabout a portion of a row of ribs or fins constructed in accordance with Figs. 13 and 14.
Figure 16:
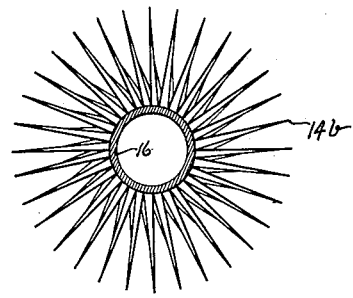
Fig. 16 is an end elevational view of the parts shown in Fig. 15.

The row of connected ribs or fins 14 of Fig. 3, or 14a of Fig. 4, or 14b of Figs. 13 and 14 may be secured at one end by solder or otherwise to the body 16 of the heat exchanger element, which may be tubular or hollow, and having a relatively thin virgin wall. Such securement is with one of the lateral edges of the rib or fin being in contact with the exterior surface of the element or tube 16 and extending at a substantial angle therefrom. In Figs. 5, 6, and 7 the end rib or fin 14 is so secured and so projects with one of its narrow edges in contact with the surface of the element or tube 16. In Figs. 8, 9, and 10 the end rib 14a of Fig. 4 is thus secured to and so projects from the exterior surface of the element or tube 16 with one of its short sides in contact with the element or tube 16. In Figs. 15 and 16 the end rib or fin 14b of the row of such ribs or fins shown in Figs. 14 and 15 is so attached to and thus projects from the element tube 16. The row of ribs or fins 14b indicated in Fig. 14 has its end rib or fin 14b so secured to the element or tube 16 with the flat portion 15 thereof in contact with the surface of the element or tube 16. The row or helical coil of the ribs or fins formed according to either, 14, 14a, or 14b, whose end rib or fin as aforesaid is secured to the element or tube 16 is placed under some longitudinal stress to cause the desired separation between the respective ribs or fins comprising such row. While subjected to such stress such row is either wound in the form of a ring about the element or tube 16 as indicated in Figs. 5 and 8 or in a helix thereabout as indicated in Figs. 7, 10, and 15, with at least the finally applied end of said row secured to the element or tube 16. Said longitudinal stress is maintained in the wound, coiled, and secured row of ribs or fins and causes a firm spring grip to be maintained by the edge of each of the ribs or fins in contact with the surface of the element or tube 16. This grip, maintained by said securement at least at the opposite ends of the applied row of such ribs or fins, affords a firm and efficient heat or cold exchanging contact between the element or tube 16 and each of the ribs or fins comprising the row of such ribs or fins applied to the element or tube. This gripping contact also affords substantial rigidity and stability to each of the several ribs or fins comprising the row thereof. Instead of being wound in a ring or helically about the element or tube 16, the row or rows of such ribs or fins may be disposed in any desired direction along and in contact with the surface of the element or tube 16 with at least its opposite ends secured thereto and maintaining throughout the row, said longitudinal tension with its attendant gripping action with an edge of such rib or fin in efficient heat or cold exchanging contact with element or tubular body 16.

When the element 16 is a hollow body one fluid is adapted to be passed along the interior thereof while a usually different fluid is passed along the exterior thereof. The heat or cold exchanging from one of said fluids to the other occurs through the medium of said ribs or fins and the wall of the body 16. When the flow of the fluid subjected to the exterior surface of the body 16 has a flow longitudinally of the body 16, such flowage causes the passage of such fluid between the component ribs or fins comprising each row thereof as well as through the open centers of each such rib or fin and the spaces between each row of such ribs or fins. When such flow is transverse to the body 16, such flowing medium flows around all of the lateral surfaces of and through the central opening in each of the ribs or fins. Even when there be no substantial flow of such fluid in any definite direction, the fluid is in contact with all surfaces of each of the ribs or fins. Thus, under all conditions, there is a substantial rate of heat exchange to or from the fluid and the fins as well as to and from the fluid and the exposed surface of the body 16, and to or from the body 16 and the portions of the ribs or fins in contact therewith. This affords a very high rate of heat or cold exchange as well as a very strong light-weight, durable, and cheap structure.

The material of which the ribs or fins are formed is preferably cold rolled or cold drawn. This increases the surface density of such material, which increases its rate or heat or cold exchange. The shearing from tube 10 of the ribs or fins 14 also increases the density of the metal at the cut surfaces, which likewise increases the rate of heat or cold exchange.

Those skilled in the art will readily understand from the foregoing, and be able to practice, the method of production of this heat or cold exchanging structural element as well as to practice the method by hand or by a number of substantially different apparatus with or without substantial change in such apparatus.

Lightness as well as cheapness of construction of a durable and highly efficient heat or cold exchanging element is of great advantage and importance in this art. It will be understood that all of said advantages, among others, are retained by the herein disclosed heat or cold exchanging element, and that said structure may be readily and conveniently applied to any contour of the body 16, as well as that when the body 16, for instance, has a tube, rod, or bar, the same may be readily bent as may be desired after the ribs or fins have been applied and secured thereto. It will also be understood that the heat or cold exchanging mechanism will comprise any desired number and form body portions 16 provided with the ribs or fins and suitably mounted upon header walls or otherwise.

The invention disclosed herein may be manufactured and used by or for the Government of the United States of America for governmental purposes without the payment of any royalties thereon or therefor.

Having now so fully described our invention that others skilled in the art may therefrom make and use the same, what we claim is:

1. The method of making a heat exchange fin comprising partially cutting a longitudinally apertured bar of high heat conductivity metal alternately and successively from opposite sides, the several cuttings being made with a substantially uniform spacing and in a direction transversely to the length of the bar to directly form by the cutting operation an apertured heat exchange fin of substantially uniform thickness throughout for securement to a heat exchange element.

2. The method of making a heat exchange device including a heat exchange element provided with a heat exchange fin secured thereto, comprising partially cutting a bar of high heat conductivity metal alternately and successively from opposite sides without wastage of material and in a direction transversely of its length to directly form by the cutting operation a heat exchange fin, the cutting in each of said cutting operations proceeding from one side of the bar and extending progressively to a point short of the opposite side thereof, disposing the fin so formed under a longitudinal stress about a heat exchange element, and securing the fin while in the stressed condition to the said heat exchange element.

3. The method of making a heat exchange device including a heat exchange element provided with a heat exchange fin secured thereto, comprising partially cutting a longitudinally apertured bar of high heat conductivity metal alternately and successively from opposite sides, the several cuttings being made with a substantially uniform spacing and in a direction transversely to the length of the bar to directly form by the cutting operation an apertured heat exchange fin of substantially uniform thickness throughout, disposing the fin so formed with its exterior edge in contact with the surface of a heat exchange element, and securing the fin in this position to the said element.

4. A row of cut heat exchange ribs of high heat conductivity metal adapted to be secured to a heat exchange element, comprising a plurality of integral ribs alternately diverging from opposite sides of the row in pairs, each of said ribs extending from one side of the row to the other and at opposite sides of the row being secured to adjacent ribs, the entire lateral surfaces of said ribs being formed by a cutting operation and cold worked thereby.

5. A heat exchange device comprising in combination a heat exchange element and a row of cut heat exchange ribs of high heat conductivity metal secured thereto, the ribs of said row being integral and alternately diverging from opposite sides thereof in pairs, each of said ribs extending from one side of the row to the other and at opposite sides of the row being secured to adjacent ribs, the entire lateral surfaces of said ribs being formed by a cutting operation and cold worked thereby.

6. A heat exchange device comprising in combination a heat exchange element and a row of cut heat exchange ribs of high heat conductivity metal, the ribs of said row being integral and apertured and alternately diverging from opposite sides thereof in pairs, each of said ribs extending from one side of the row to the other and at opposite sides of the row being secured to adjacent ribs and the entire lateral surfaces of said ribs being formed by a cutting operation and cold worked thereby, the row of ribs being disposed with its exterior edge in contact with the surface of a heat exchange element and secured thereto.

ALFRED J. BERG.
JOHN O. HUSE.